United States Patent Office 3,296,151
Patented Jan. 3, 1967

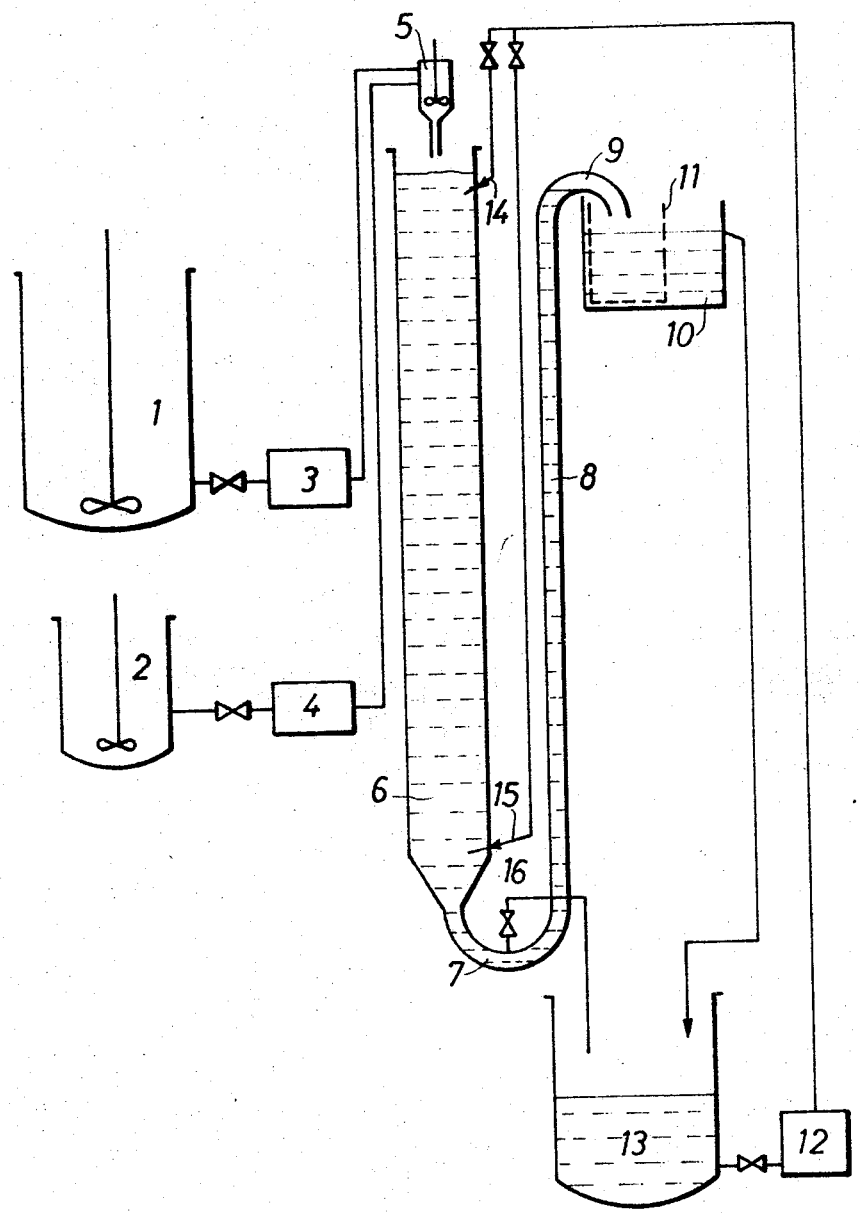

3,296,151
PRODUCTION OF SILICA BONDED ZEOLITIC MOLECULAR SIEVE GRANULES
Gerhard Heinze and Ernst Podschus, Leverkusen, Germany, assignors to Farbenfabriken Bayer Aktiengesellschaft, Leverkusen, Germany, a corporation of Germany
Filed Aug. 16, 1962, Ser. No. 217,326
Claims priority, application Germany, Aug. 19, 1961, F 34,738
5 Claims. (Cl. 252—448)

This invention relates to a new process for the production of molecular sieve granules in spherical form.

The invention further concerns an apparatus adapted to carry out the process for the production of molecular sieve granules in spherical form.

Molecular sieve granules are very important technical products. Owing to their special adsorption properties they may be employed as carriers for catalysts, as selective adsorption agents, e.g. drying agents, in petrochemical processes for the adsorption of hydrocarbons and as ion-exchange materials in a large variety of processes.

Most processes require the use of adsorption agents in granulated form. Therefore there is a high demand for methods of granulating molecular sieve zeolites.

It is an object of the present invention to provide a new process for the production of spherical molecular sieve granules.

It is another object of the invention to provide molecular sieve granules being resistant to abrasion.

It is another object of the invention to provide molecular sieve granules of high density made of condensed zeolite aggregates with a diameter of above $10\mu$.

It is a further object of the invention to provide the molecular sieve granules with an unreduced adsorption power of the enclosed zeolite despite of the zeolite bonding.

It is still a further object of the present invention to provide the molecular sieve granules being resistant to water.

Still another object of the invention is to provide molecular sieve granules which can easily be transformed by ion exchange with dilute solutions into other forms.

Still another object of the invention is to provide an apparatus for producing spherical molecular sieve granules.

Several processes are known to prepare adsorption agents in granulated forms. Substances in powder form are compressed into tablets or the moistened powder, admixed with a binder, is kneaded into a stiff paste, which is then shaped by means of extrusion presses or other granulating apparatus into small rods, sausages or similar elements. The form of granule which is preferred in many respects is the spherical form, firstly on account of the increased resistance to abrasion by comparison with other shaped elements of the same mass and secondly on account of the smaller resistance to flow of an adsorption column filled with spherical granules. Such granulated materials are formed for example by rolling material in powder form in a granulating dish while simultaneously spraying in liquid.

A process is also known for transforming gellable sols into a spherical gel granulates by effecting the sol-gel conversion while the sol is dispersed in drop form in a second liquid which is immiscible therewith. This process is combined with a solidifying process of the liquid phase initiated by the sol-gel conversion. However, such a gelling can only be produced effectively with a limited number of systems and consequently this process cannot be employed with many technically important substances and especially with substances in powder form. Moreover, small quantities of inert solid substances (mainly consisting of a gel) have been incorporated into such gel granules in order to impart a higher resistance to abrasion to the granules.

With molecular sieve zeolites, the production of solid granules is difficult on account of the uniformly finely crystalline nature of these substances. They have so far usually been formed into granules by adding clay-like binders, such as kaolin, bentonite and attapulgite. However, these binders have the disadvantage that they do not impart a satisfactory resistance to abrasion to the granules and that, for hardening purposes, temperatures above 500° C. are necessary. These temperatures cannot be used with various zeolites on account of their thermal sensitivity. It has already been proposed to use silicic acid esters for binding purposes as these are hydrolyzed into a silica gel. The granules bonded therewith are not sufficiently hard and, in addition, the high cost of silicic acid esters opposes the use thereof.

According to the present invention there is provided a process for the production of molecular sieve granules in spherical form with a predominant content of molecular sieve, the said granules being bonded with silicic acid, which comprises stirring the powdery molecular sieve zeolites to be bonded with aqueous silica sol, to form a flowable suspension of pH 8–10, advantageously pH 8.2–9.0, mixing this suspension with comparatively small quantities of a second suspension of finely divided magnesium oxide in water in amount of 0.1–3.0% MgO calculated on dried activated granules and distributing the still-liquid gellable mixture of the two suspensions in drop form in a manner known per se in a liquid immiscible with water until the sol-gel conversion takes place.

It is surprising that the silica sols which are extremely sensitive to addition of electrolyte can be mixed with large quantities of the electrolytically strongly dissociated molecular sieve zeolites in aqueous suspension to give a suspension which is stable for several hours, and that furthermore such a suspension can be caused to gel almost immediately by adding a comparatively minimum quantity of an insoluble compound. As is known, even molecular sieve zeolites freed by careful washing from adhering impurities produce pH values between 9 and 11 on suspension in distilled water, i.e. pH values which are just in the range of the maximum flocculation sensitivity of aqueous silica sols. Consequently, it was not in any way to be expected that compatibility exists between the two components.

The zeolite granules obtained according to the invention constitute an essential technical advance, since, in addition to the advantages of the spherical form already mentioned above, they also have a number of other properties which are important for practical applications, such as a smooth and exceptionally abrasion-resistant surface, a high degree of hardness, a high zeolite content and an unreduced adsorption power of the enclosed zeolite despite the solid bonding. An additional advantage of the granules produced by the new process is that they are resistant to water and the zeolite contained therein can easily be transformed by ion exchange with dilute salt solutions into other forms. This fact is also surprising, since without addition of zeolite, pure silica gel beads produced from silica sol burst because of internal stresses on coming into contact with water.

In carrying out the process according to the invention, the powdery zeolite to be granulated is mixed with aqueous silica sol (advantageously of 15–40% $SiO_2$ content) into a flowable suspension of pH 8–10. On the other hand, a likewise aqueous suspension of hydrated magnesium oxide is also prepared by suspension of a finely divided magnesium oxide. It is advisable to allow this suspension to stand for at least 1 hour before use, so that the oxide can be hydrated. The two suspensions are then homogeneously mixed in a suitable proportion in a throughflow vessel with a high-speed stirrer or another mixing arrangement, in order immediately thereafter to flow through a nozzle into an organic liquid, in which the stream is split up into drops. The residence time of the drops in the organic phase is so chosen that the gelling process is initiated during this time and the gel balls which are formed have achieved the stability necessary for the after-treatment on leaving the organic phase.

The invention also provides a process for the production of special molecular sieve granules with high density and low content of binding agent. According to the new process in a first step the zeolite material is mixed and condensed with water or a part of the silica sol used as binding agent to form a crumbly mass. In a second step this mass is treated as described in the foregoing section. By the consolidation process are formed zeolite aggregates with a particle diameter of above 10μ, which are not divided in smaller ones in the following granulating process.

For carrying out the new process, the zeolite-silica sol suspension is adjusted to a strictly defined pH range which may perhaps differ from case to case. The pH may possibly be adjusted by adding acid and the limits of said pH range depend on various factors such as concentration, specific surface and electrolyte content of the sol as well as quantity and nature of the zeolite and the properties of the magnesium oxide suspension added for gelling purposes. For example, the possible pH range is between pH 8.2 and pH 8.8 when using zeolite 4A and a substantially electrolyte-free 30% silica sol of about 200 m.$^2$/g. specific surface according to Brunauer-Emmet-Teller (BET) in a mixing ratio of 70% zeolite content of the dehydrated granules. With somewhat less alkaline adjustment of the zeolite suspension, the latter would not show the necessary stability, but would gradually change into a soft jelly. On the other hand, with only slightly higher pH, the gelling agent magnesium oxide used in the process entirely loses its efficacy. A clear explanation of this cannot be provided at the present time, since no clear conceptions exist concerning the mechanism of this peculiar and long known process of the gelling of silica sols by the insoluble magnesium oxide. However, for carrying out the process, it is important that it is possible, within the aforementioned pH range, by choosing the conditions and more especially of the quantity of magnesium oxide used to control the gelling process in such a way that the solidification of the liquid suspension occurs suddenly after an incubation time of a few seconds up to several minutes.

Silicia sols prepared by various methods and having a specific surface according to BET of about 150–400 m.$^2$/g. are suitable for the process according to the invention provided that they contain at least about 10% by weight of $SiO_2$. For example, a 15% sol produced by peptizing silicia gel and having a specific surface of 200 m.$^2$/g. can be used for the process. However, it is advantageous to use those silica sols which are produced by ion exchanger treatment of dilute water glass solutions and subsequent alkali stabilization. By comparison with the sols obtained by other processes, those sols have particularly low contents of impurities and consequently have an astonishing stability. Such a sol with a surface of 200 m.$^2$/g. can for example be evaporated at atmospheric pressure to a content of 40% by weight. The normal commercial cloudy silicia sols with surfaces of 100 m.$^2$/g. are unsuitable, since they produce soft granulated materials.

Sols with a high $SiO_2$ content are used in the process for the production of granulated materials of high bulk density, while more dilute sols produce granules of lower specific gravity and particularly high porosity.

As molecular sieve zeolites, there are predominantly to be considered those which are in the potassium or sodium form. It is important that these zeolites are freed during the production thereof by thoroughly washing out essential quantities of alkali impurities. By subsequently neutralizing such excess alkalis with dilute acid, there might be formed a certain quantity of salt, which would unnecessarily limit the storage time of the zeolite-silicia sol suspension because of gradual thickening. The pH of a suspension of the zeolite in distilled water should preferably not be higher than 11. Weaker alkaline zeolites, in which some of the alkali ions are replaced by hydrogen ions, differing from the stoichiometric composition, can however be used for the new process. In general, it is not necessary completely to dehydrate the zeolites before mixing with the silicia sol and the zeolites can be used in air-dry form or can be partially dehydrated, for example by drying at 110° C.

The production of zeolite-silica sol suspensions which are stable for a longer period encounters difficulties with zeolites containing alkaline earth metals or heavy metals. Although it is possible to granulate a calcium zeolite by rapidly processing the zeolite-sol suspension further, it is preferred to granulate the zeolite in question in the sodium form. The conversion to the calcium form is then effected, not in the usual way by treating the powdered zeolite with dilute calcium salt solutions, but using dried spherical granules which have been solidified by heat treatment. It is also possible in this way to produce extremely hard spherical granules of the calcium-containing zeolite 5A which is important for petrochemical processes. The previous methods for attempting to obtain hard granules of this zeolite have met with difficulties, since a heat treatment at the temperatures necessary for solidifying clay binders is scarcely possible due to the thermal sensitivity of this zeolite. Some practical examples of carrying out the method of the present invention will now be described.

*Example 1*

Granulation of a zeolite (Zeolite 4A) produced according to U.S. Patent 2,882,243 with a composition of

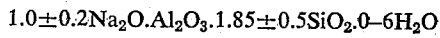

$$1.0\pm0.2Na_2O.Al_2O_3.1.85\pm0.5SiO_2.0-6H_2O$$

will now be described with reference to the accompanying diagrammatic drawing showing by way of example an embodiment of an apparatus suitable to carry out the herein described process. In the single figure of the drawing, containers 1 and 2 are supply tanks for components A and B, which are supplied by means of proportioning pumps 3 and 4 in a stream, which is constant as a function of time, to a mixing nozzle 5 provided with a high-speed stirrer device. The combined components flow from the mixing nozzle 5 into the organic phase which is located in a pipe 6, the stream immediately being broken up into drops. The mixing nozzle can end above the liquid level or even dip thereinto. The density of the organic phase is so chosen that the drops sink therein. The pipe 6 constitutes the actual granulating zone, along which the descending drops of the suspension solidify by gelling of the hydrosol content. The pipe 6 is connected through an elbow 7 to the pipe 8 of smaller diameter, which serves as the conveyor zone and which ends in an overflow bend 9. This overflow also simultaneously regulates the height in the granulation zone 6. The overflow 9 terminates above a collecting container 10 which is filled with the same organic liquid and from which the granules are discharged by means of a screening device 11. The reference 16 represents an emptying pipe.

The organic phase filling the system is not static but circulates in the direction of the arrows as indicated. A circulating pump 12 delivers from a supply container 13 to two inlet unions 14 and 15, which are arranged tangentially on the top and bottom ends of the granulation zone 6. If the diameters of the two vertical pipes 6 and 8 are in the ratio of for example 3:1, then provided the supply takes place through the inlet union 14, the upward flow in the conveyer zone 8 is nine times the downward flow in the granulating zone 6. However, if the supply quantity is distributed equally to the inlet unions 14 and 15, for the purpose of avoiding too strong eddy formation, then the upwardly flow important for the conveyance of the granules is 18 times the downward flow obtaining in the granulating zone. Linear velocities of 5–30 cm./sec. are desirable for the upward flow. It is clear that the circulation quantity can be so regulated within a wide range that the downward flow in 6 is insignificant and is, at the most, of the order of the descending velocity of the particles and at the same time, an upward flow obtains in 8, which over-compensates the speed of descent of the particles and thus conveys them upwardly. This is further promoted by a constriction in cross-section caused by the here more densely packed granules themselves. The liquid stream discharges from the overflow 9 and the granules are rinsed in a collecting container filled with organic liquid. By means of inter-changeable wire strainers or other screening devices, for example a continuously revolving endless band, the granules are then gently lifted out of the liquid and exposed to a stream of hot air for drying purposes. As a result of being collected under liquid, the mechanical stressing during the assembly of the still fairly sensitive granulated elements is reduced, the strength of said granules being increased during the additional residence time until being lifted out of the liquid so that they are able to withstand the deformation due to the weight of the layers of granules disposed thereabove.

The dimensions of the granulating device are as follows: the granulation zone 6 has a length of 2 m. and a diameter of 75 mm. and the conveyor zone 8 has a diameter of 25 mm. The organic liquid is trichloroethylene, which is at room temperature, and this is circulated by pumping at a velocity of 200 litres per hour. The supply at the inlet unions 14 and 15 is 100 litres per hour at each. A linear velocity of 0.6 cm./sec. is calculated for the downward flow in 6 and a velocity of 11.3 cm./sec. for the upward flow in 8.

For the component A, 10 kg., of crystalline sodium zeolite A with water content of 15% are suspended in 6.54 kg. of 14% silica sol with a specific surface according to BET of 200 m.$^2$/g. For this purpose, the finely powdered zeolite is consolidated into lumps by means of a roll press and these lumps are gradually incorporated into the silica sol by stirring. A thinly liquid homogeneous suspension is formed, and the pH of this suspension is adjusted to 9.0 by adding dilute hydrochloric acid. The suspension is stable for several hours.

The component B consists of a suspension of finely divided, hydrated magnesium oxide in water, which is prepared as follows:

60 g. of commercial "Magnesia usta extra leicht" with an MgO content of 83% are suspended in water by means of a high-speed stirrer device and the suspension is made up to 1 litre. The solution is left to stand for at least 1 hour before use.

The components A and B are supplied through proportioning devices to the mixing nozzle 5 in a ratio by volume of 5:1. The jet of the mixed suspensions leaving the nozzle is broken up in the trichloroethylene into drops, which slowly descend therein and solidify after 20 seconds before reaching the reversal loop.

After drying at 110° C. and subsequent dehydration of the zeolite at 400° C., the granules which have a diameter of 3–5 mm. contain 90% by weight of anhydrous zeolite. The adsorption capacity of the hard granulates corresponds to the powder-like zeolite contained therein.

*Example 2*

*Suspension I.*—700 ml. of normal commercial, alkali-stabilized, 30% silica sol with a specific surface of 200 m$^2$/g. and a pH value of 9.0 are made weakly acid by slowly adding 120 ml. of normal hydrochloric acid while stirring. The acidic sol thus obtained then contains 26% by weight of SiO$_2$. To this sol there are added 1000 g. of a normal commercial sodium zeolite A in powder form, which has a water content of 14% and produces a pH of 10.3 when suspended in water. A thinly liquid suspension with a pH value of 8.6 is obtained. This suspension is stable for several hours.

*Suspension II.*—60 g. of commercial "Magnesia usta extra leicht" with an MgO content of 83% are suspended in water by means of a high-speed stirrer device and the suspension is made up to 1 litre. The solution is left to stand for at least 1 hour before use.

In a preliminary experiment, 20 ml. of the suspension I are mixed with each of 1, 2 and 3 ml. of suspension II. Gelling occurs 25, 20 and 10 seconds, respectively, after combining the components. The gel formed by adding 1 ml. of magnesia suspension is fairly soft, but the other two gel samples are sufficiently solid. For the granulation, 2 ml. of magnesia suspension are used for 20 ml. of each zeolite suspension.

Streams of 100 ml. per minute of suspension I and 10 ml. per minute of suspension II are continuously supplied to a mixing vessel provided with a high speed stirrer device, the average residence time in said vessel being at the most 5 seconds. The mixture of the suspension runs in a thin stream into a solvent mixture consisting of chlorinated hydrocarbons, this mixture being in a tall narrow vessel and the density thereof being so adjusted that the drops of the suspension formed sink slowly therein. The drops solidify into gel balls before reaching the bottom of the vessel. The granules are lifted out of the solvent by means of a wire strainer, dried at 110° C. and thereafter heat-treated for 3 hours at 400° C. The granules are hardened thereby and simultaneously the zeolite is activated.

The activated granules have a content of 77% of anhydrous Na-zeolite A and show a bulk density of 550 g./litre. The MgO content originating from the gelling reagent is only 0.8%.

*Example 3*

The same sol as in Example 2 was acidified by treatment with a cation exchanger in the H$^+$ form. Samples, each consisting of 120 ml. of this acid sol, were each stirred with 100 g. of the same Na-zeolite A as in Example 1 to form suspensions. Different pH values of the prepared suspensions were adjusted by further addition of small quantities of HCl or NaOH. 20 ml. samples of these suspensions were tested for their gelling capacity, with 1, 2 and 3 ml., respectively, of the same MgO suspension as in Example 1. The following Table 1 indicates the influence of the pH value on the time elapsing until the gel formation occurs and until the forming gels are solid.

TABLE 1

| pH of the zeolite suspension | Quantity of MgO suspension added | | |
|---|---|---|---|
| | 1 ml. | 2 ml. | 3 ml. |
| 9.2 | Does not gel | Does not gel | Does not gel. |
| 9.0 | do | Very soft after about 4 min. | Very soft after about 2 min. |
| 8.8 | do | Soft after 65 seconds. | Solid after 55 seconds. |
| 8.6 | Very soft after about two min. | Solid after 55 seconds. | Solid after 50 seconds. |
| 8.4 | Soft after 75 seconds. | Solid after 45 seconds. | Very hard after 38 sec. |
| 8.2 | Soft after 60 seconds. | Very hard after 35 sec. | Very hard after 26 sec. |
| 8.0 | Zeolite suspension unstable | | |

For the continuous production of spherical granulated materials by the method described in Example 1, the zeolite suspension is here adjusted preferably to pH 8.2–8.4, as indicated by the table. With the selected zeolite-sol ratio, the activated granules consist of 66% of anhydrous zeolite.

*Example 4*

1200 ml. of 31% silica sol with a specific surface of 290 m.²/g. are made weakly acid with 60 ml. of normal hydrochloric acid and stirred with 1000 g. of Na-zeolite X to form a suspension. The suspension obtained with the pH 8.7 is stable for several hours and solidifies into a solid gel after adding 3 ml. of MgO suspension per 20 ml. and after incubating for 35 seconds.

The continuous granulation is carried out in the manner described in Example 1.

*Example 5*

1000 g. of the same sodium zeolite A as in Example 2 are blended with only 450 ml. of an alkali-stabilized 15% silica sol of the specific surface 2000 m.²/g. in a kneader to form a crumbly mass. Another 170 ml. of sol, which had been made acid with 5 ml. of 6.2-normal hydrochloric acid are added and a stable liquid suspension of pH 8.7 was formed. The gelling is effected by adding 2 ml. of MgO suspension per 20 ml. after 20 seconds to give a solid gel.

The production of spherical granules is effected by the method described in Example 1. A flowable suspension with a substantially smaller liquid quantity than in Example 2 is produced by a preliminary condensation of the material in the kneader. In this way, granules with a lower binder content and higher density can be obtained. The spherical granules produced by this example contain 90% of anhydrous zeolite after having been dried and activated and show a bulk density of 670 g./litre.

*Example 6*

45 g. of the sodium zeolite A granulated material produced according to Example 2, which was adjusted to a moisture content of 21% were added to 100 ml. of 1-molar $CaCl_2$ solution. After 2 hours, the substances were filtered off and washed. Analysis of the solution showed that 50% of the available $Ca^{++}$ ions had been taken up by the zeolite.

*Example 7*

45 g. of the sodium zeolite A granules prepared according to Example 2, which was adjusted to a moisture content of 21%, were added to 100 ml. of 1-molar $AgNO_3$ solution. After 2 hours the supernatant solution only contained traces of silver.

We claim:
1. A process for the production of substantially spherical silica bonded molecular sieve granules comprising the steps of
   (a) forming a flowable suspension of a molecular sieve zeolite-silica sol having a pH of between 8–10 by adding to an aqueous silica sol under stirring, a powdery molecular sieve zeolite in an amount to produce a product having a molecular sieve zeolite content of between 50 and 90%, said silica sol having a specific surface area of 150 to 400 m.²/g. BET on drying, said silica sol being used in a concentration of 10 to 40% by weight of $SiO_2$, a suspension of said zeolite in distilled water having a pH not exceeding 11,
   (b) forming a suspension of finely divided magnesium oxide by adding magnesia usta to water,
   (c) admixing the suspensions obtained in steps (a) and (b), utilizing the same in an amount producing a product having an MgO content of between 0.1 to 3% by weight,
   (d) substantially immediately introducing the suspension formed in step (c) in dropwise form into a liquid immiscible with water whereby spherical granules are formed by sol-gel conversion, and
   (e) separating the granules formed in step (c) from the liquid and drying and dehydrating said granules.
2. Process according to claim 1, which comprises subjecting the granules formed in step (e) to a further treatment for introducing into said granules a member selected from the group consisting of alkaline earth metal ions and heavy metal ions, said treatment comprising subjecting the granules of step (e) to ion exchange with a solution of a member selected from the group consisting of alkaline earth metal salts and heavy metal salts.
3. A process according to claim 1, wherein said molecular sieve zeolite is

$$1.0\pm0.2Na_2O\cdot Al_2O_3\cdot 1.85\pm0.5SiO_2\cdot 0-6H_2O$$

4. A process according to claim 1, wherein said molecular sieve zeolite prior to use in step (a) is condensed by mixing the same with water followed by compression to form aggregates.
5. A process according to claim 4, wherein said condensing is effected utilizing therefor a part of the silica sol required in connection with step (a).

References Cited by the Examiner

UNITED STATES PATENTS

| | | | |
|---|---|---|---|
| 2,380,945 | 8/1945 | Collins | 106—38.3 |
| 2,446,783 | 8/1948 | Payne | 252—359 |
| 2,631,983 | 3/1953 | Milliken | 252—448 |
| 2,672,453 | 3/1954 | Wankat | 252—448 |
| 2,796,409 | 6/1957 | Schwartz | 252—448 |
| 2,865,867 | 12/1958 | Van Dyke et al. | 252—448 |
| 3,023,171 | 2/1962 | Smith | 252—359 |
| 3,140,249 | 7/1964 | Plank et al. | 252—455 X |
| 3,207,701 | 9/1965 | Curtin | 252—451 |

FOREIGN PATENTS 855,301 11/1960 Great Britain.

MILTON WEISSMAN, *Primary Examiner.*

MAURICE A. BRINDISI, OSCAR R. VERTIZ,
*Examiners.*

E. J. MEROS, *Assistant Examiner.*